(12) United States Patent
Scouller et al.

(10) Patent No.: US 8,341,372 B2
(45) Date of Patent: Dec. 25, 2012

(54) EMULATED ELECTRICALLY ERASABLE (EEE) MEMORY AND METHOD OF OPERATION

(75) Inventors: Ross S. Scouller, Austin, TX (US); Frank K. Baker, Jr., Austin, TX (US); Venkatagiri Chandrasekaran, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 299 days.

(21) Appl. No.: 12/769,795

(22) Filed: Apr. 29, 2010

(65) Prior Publication Data

US 2011/0271035 A1   Nov. 3, 2011

(51) Int. Cl.
*G06F 12/02* (2006.01)
(52) U.S. Cl. ................. 711/165; 711/E12.002
(58) Field of Classification Search ............. None
See application file for complete search history.

(56) References Cited

U.S. PATENT DOCUMENTS

| | | | |
|---|---|---|---|
| 6,904,400 B1 | 6/2005 | Peri et al. | |
| 7,058,755 B2 | 6/2006 | Nallapa | |
| 2003/0093711 A1 | 5/2003 | Harari et al. | |
| 2007/0014007 A1 | 1/2007 | Miyatake et al. | |
| 2007/0143528 A1 | 6/2007 | Przybylek | |

FOREIGN PATENT DOCUMENTS

EP   1237085 A1   9/2002

OTHER PUBLICATIONS

PCT Application No. PCT/US2011/031084, International Search Report and Written Opinion, dated Nov. 30, 2011.

*Primary Examiner* — Edward Dudek, Jr.
*Assistant Examiner* — Ryan Dare
(74) *Attorney, Agent, or Firm* — James L. Clingan, Jr.; Robert L. King

(57) ABSTRACT

A system has an emulation memory having a plurality of sectors for storing information. A controller calculates a number of addresses used divided by a number of valid records in a predetermined address range of the emulation memory. An amount of remaining addresses in a currently used space of the emulation memory which have not been used to store information is calculated. A determination is made whether the calculation is greater than a first predetermined number and whether the amount of remaining addresses is greater than a second predetermined number. If both the fraction is greater than the first predetermined number and the amount of remaining addresses is greater than the second predetermined number, any subsequent update requests are responded to using the currently used space of the emulation memory. Otherwise a compression of the emulation memory is required by copying valid data to an available sector.

20 Claims, 3 Drawing Sheets

US 8,341,372 B2

EMULATED ELECTRICALLY ERASABLE (EEE) MEMORY AND METHOD OF OPERATION

CROSS-REFERENCE TO RELATED APPLICATION(S)

This application is related to U.S. patent application Ser. No. 12/769,786 and publication number 2011/0271034-A1, filed on even date, entitled "MULTIPLE PARTITIONED EMULATED ELECTRICALLY ERASABLE (EEE) MEMORY AND METHOD OF OPERATION," naming Ross Scouller, Frank K. Baker, Jr., and Venkatagiri Chandrasekaran as inventors, and assigned to the current assignee hereof.

BACKGROUND

1. Field

This disclosure relates generally to memory systems, and more specifically, to a method of operating an emulated electrically erasable (EEE) memory.

2. Related Art

Emulated electrically erasable (EEE) memories typically use a random access memory and a non-volatile memory that is electrically erasable combined to provide a memory system that has increased endurance over a regular non-volatile memory for a comparable size to that of the random access memory. This is achieved using a non-volatile memory much larger than the random access memory but EEE memory operates as if it were only the size of the random access memory. Thus the EEE memory emulates an electrically erasable memory of a reduced size from that which is used by the EEE memory but with an increase in endurance. This is useful in situations in which endurance is very important such as automotive and industrial applications in which data is updated often and must be stored in a non-volatile manner.

The cost of increased endurance is thus to increase the memory size of the non-volatile memory, which makes the device more expensive. Thus there is a continuing need to achieve effective endurance while avoiding further increasing costs due to increasing memory size.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect an emulated electrically erasable (EEE) memory has a RAM and an NVM having more capacity than the RAM in which compression is used to utilize the extra capacity. The timing of the beginning of a compression process is beneficially delayed when the data is relatively highly dynamic in that most of the data is updated regularly instead of a small portion of the data being updated regularly. This delaying of compression increases the endurance of the system for a given amount of NVM, especially when the data is highly dynamic. This is better understood by reference to the drawings and the following specification.

In one embodiment, a flash memory is used as the NVM. In one example, and as used herein, programming refers to storing a logic level zero to a bitcell and erasing refers to storing a logic level one to a bitcell. However, in alternate embodiments, programming may refer to storing a logic level one to a bitcell and erasing may refer to storing a logic level zero to a bitcell. A logic level zero may also be referred to as a logic low and a logic level one may also be referred to as a logic high.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, the plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "dessert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Figure 1:
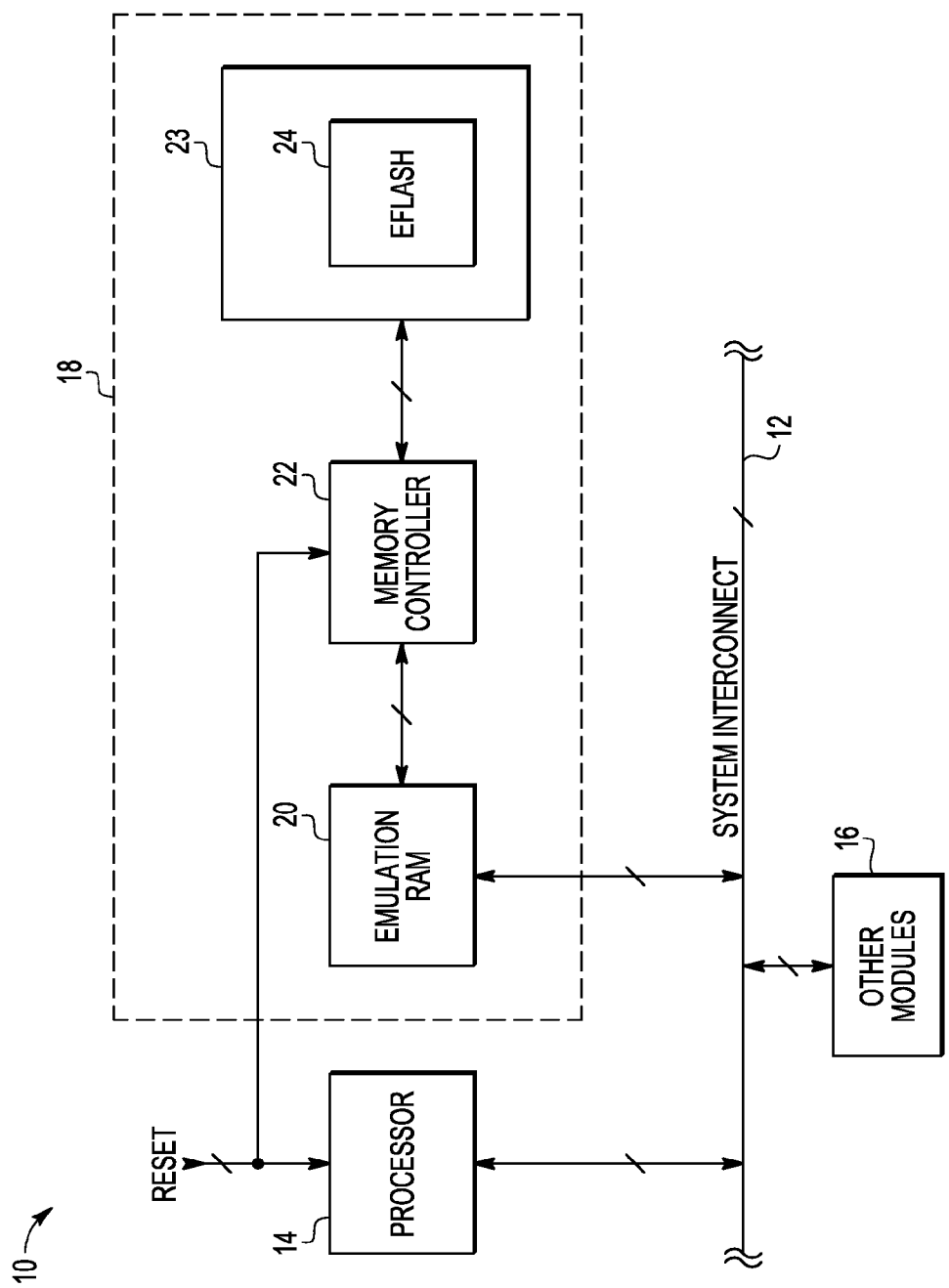
FIG. 1 illustrates in block diagram form a system, an emulated electrically erasable memory using a non-volatile memory, useful in implementing an embodiment of the present invention.

FIG. 1 illustrates, in block diagram form, a system 10 which includes a processor 14, other module(s) 16 that may include a main memory, a system interconnect 12, and an EEE memory system 18 (which may also be referred to as a memory system or a non-volatile memory system). Each of processor 14, other module(s) 16, and EEE memory system 18 are bidirectionally coupled to system interconnect 12. EEE memory system 18 includes a RAM 20, a memory controller 22, a non-volatile memory (NVM) 23 that includes an Eflash 24. RAM 20 is bidirectionally coupled to system interconnect 12 and to memory controller 22. Memory controller 22 is coupled to NVM 23 and controls the operation of Eflash 24. A reset signal is provided to processor 14 and memory controller 22. This reset signal may be, for example, a global reset signal for system 10.

Processor 14 can be any type of processor, such as a microprocessor, digital signal processor, etc., or may be any other type of interconnect master which can access EEE memory system 18. In one form, system interconnect 12 is a system bus. Other forms of interconnect may be used including, for example, crossbars, point-to-point connections, and optical and wireless transmission techniques. Other modules 16 may include any type of module, such as, for example, another memory, another processor, another interconnect master, a peripheral, an input/output (I/O) device, etc. Alternatively, no other modules may be present in system 10.

In operation, processor 14 can send access requests (read or write access requests) to memory system 18. The access requests from processor 14, which include an access address, and, in the case of a write access, associated write data, are provided to RAM 20. In the case of a read access, RAM 20 provides processor 14 the data stored at the received access address location. In the case of a write access, RAM 20 stores the received write data at the received access address location. In the case of a write access, memory controller 22 may detect an update of RAM 20 and selectively store the received access address and associated write data to Eflash 24. For example, in the case of an update (a write) to RAM 20, the received access address and associated write data are used to form a record that is written to Eflash 24 at the next available location. This next available location is logically sequential to a location that was loaded during an immediately preceding loading of Eflash. (Note that, referring to FIG. 1, the received access address can be provided as an address to NVM 23 and the associated write data as data in to Eflash 24). In one example, the writing of the record corresponding to the RAM update is only performed if the value that is currently stored at the RAM location is different from the new write value associated with the write access request for that RAM location. In this manner, Eflash 24 can store the values of RAM 20 which have been updated in a more permanent manner. This above described operation is why RAM 20 is shown as an emulation RAM. When RAM 20 loses power, its data is lost. Upon restoring power, the values of the RAM may be restored from flash memory 23, which does not lose its data upon losing power. Flash memory 23 and Eflash 24 have a greater storage capacity than RAM 20.

RAM 20 has the capacity for storing 2048 bytes. Eflash memory 24 has 16 sectors in which each sector has the capacity for storing 256 records. Each record includes two bytes in which the two bytes are in consecutive locations in RAM 20. A benefit of flash is its low cost which is due to being high density. A disadvantage of flash, which arises from the high density architecture, is that erasing is not available on a bit basis or even a record basis. In this description, a sector is considered the smallest unit of flash memory that can be erased with a single erase. A single erase may be achieved using a number, such as fifty, erase pulses, Each erase pulse is applied to all of the particular sector being erased, Thus, initially, Eflash memory 24, in order to store the initial state of all 1024 of the possible 2-byte records, would fill four sectors. As operation continued there would a number of sectors that are full of data including one that is currently being filled referenced as full/active. Another group of sectors would be erased and ready to be written, which in the case of non-volatile memories may referred to as ready to be programmed. To guard against a case in which most of the data is not being changed and a small portion is experiencing most of the changes, it is considered necessary to keep four sectors ready because of the large amount updating that will be required when the sector that has the oldest data needs to be erased.

Figure 2:
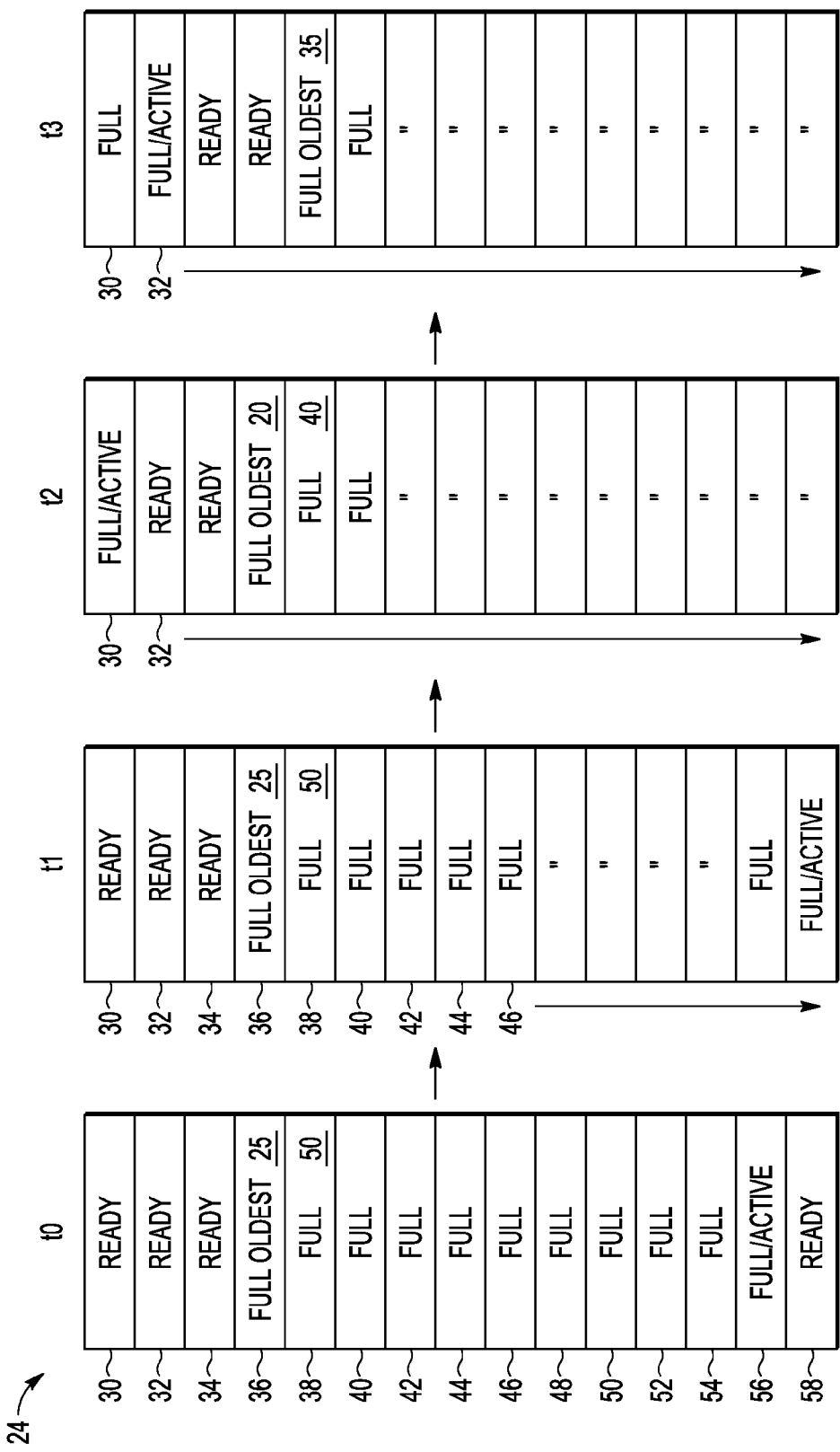
FIG. 2 illustrates, in block diagram form, the non-volatile memory shown in progressive states of operation according to the embodiment.

Shown in FIG. 2 is a progression of the contents of Eflash memory 24 as sectors are written and erased. Eflash 24 comprises sectors 30, 32, 34, 36, 38, 40, 42, 44, 46, 48, 50, 52, 54, 56, and 58 (30-58). Time t0 is a condition during operation in which sectors 36, 38, 40, 42, 44, 46, 48, 50, 52, and 54 are completely full of data and sector 56 is in the full/active condition. Sectors are 58, 30, 32 and 34 are erased and ready to be written. Sector 58 would be the next one to be written. Time t0 in this example is the time during the writing of sector 56 in which a decision must be made as to whether compression should begin. This may be the situation in which the next write would be in the next sector which in this case would be sector 58. Compression in this case is the process of erasing a sector which includes writing valid data into the sector that has available space to be written. In this case, the sector next to be erased is sector 36; considered the oldest sector because it has the data that was written the longest time ago. The data in sector 38 has more recently written data than the data written into sector 36. Thus the valid data present in sector 36 would need to be written in sector 56 if space is still available there or sector 58 as the next sector with available space. As shown in FIG. 2 for this example at time t0, the oldest sector, sector 36, has 25 valid records and the next to oldest sector, sector 38, has 50 valid records. These 25 and 50 valid records in sectors 36 and 38, respectively, may be called sedentary records. With sectors 30-58 each having the capacity of 256 records, 25 records and 50 records are examples of highly dynamic records. For erasing sector 36 only 25 records would have to be written and similarly only 50 would have to be written for erasing sector 38. In this case assuming that sector 56 has been fully written there are four sectors available to be written in Eflash 24, which means that there 1024 (4×256) remaining addresses available, which may be called available space, in the current flash space at time t0. In this case of highly dynamic data, it is not necessary to begin the compression of sector 36 given the amount of available space. Another way of saying it is that given the highly dynamic data, there is more space available than is necessary. A way of calculating the dynamic activity is to divide the total number of used record addresses in the address space that is being considered for erasure by the number of valid records. Thus, for sector 36, the dynamic activity is 256 divided by 25 for the case of time t0. The higher the dynamic activity the higher the number.

Shown at time t1 sector 58 has become the full/active sector but none of the valid data present in the oldest sector, sector 36, has been written into sector 58 due to the high dynamic activity. The process of compression was thus delayed and not started due to the dynamic activity and available space of sectors 30, 32, and 34. As operation continues, sector 58 begins filling up until eventually another decision point is reached where a decision is to be made as to whether compression should begin relative to the oldest sector. Also during the operation some of the valid data in the various sectors, including sectors 36 and 38, may have been updated reducing the valid data in those sectors too.

Shown at time t2, is Eflash 24 showing the updating of sectors 36 and 38 to 20 and 40 valid records, respectively, and that sector 36 was not subjected to compression again due to the high dynamic activity. This decision to not subject sector 36 is also based on a relatively high dynamic activity for sector 38. Operation continues until another decision point is reached as to subjecting sector 36 to compression.

Shown at time t3 is Eflash 24 showing that sector 36 has been subjected to compression by having had its valid data written to sector 32, been erased, and now showing as being ready. Sector 32 is now the full/active sector and sector 58 is full. This shows that 5 more valid records in sector 38 were updated to another sector so that sector 38 now has 35 valid records. If sector 36 had been subjected to compression at time t0 and then sector 38 at time t3, at least 10 extra writes, 5 for sector 36 and 5 for sector 38, would have been performed reducing endurance.

Figure 3:
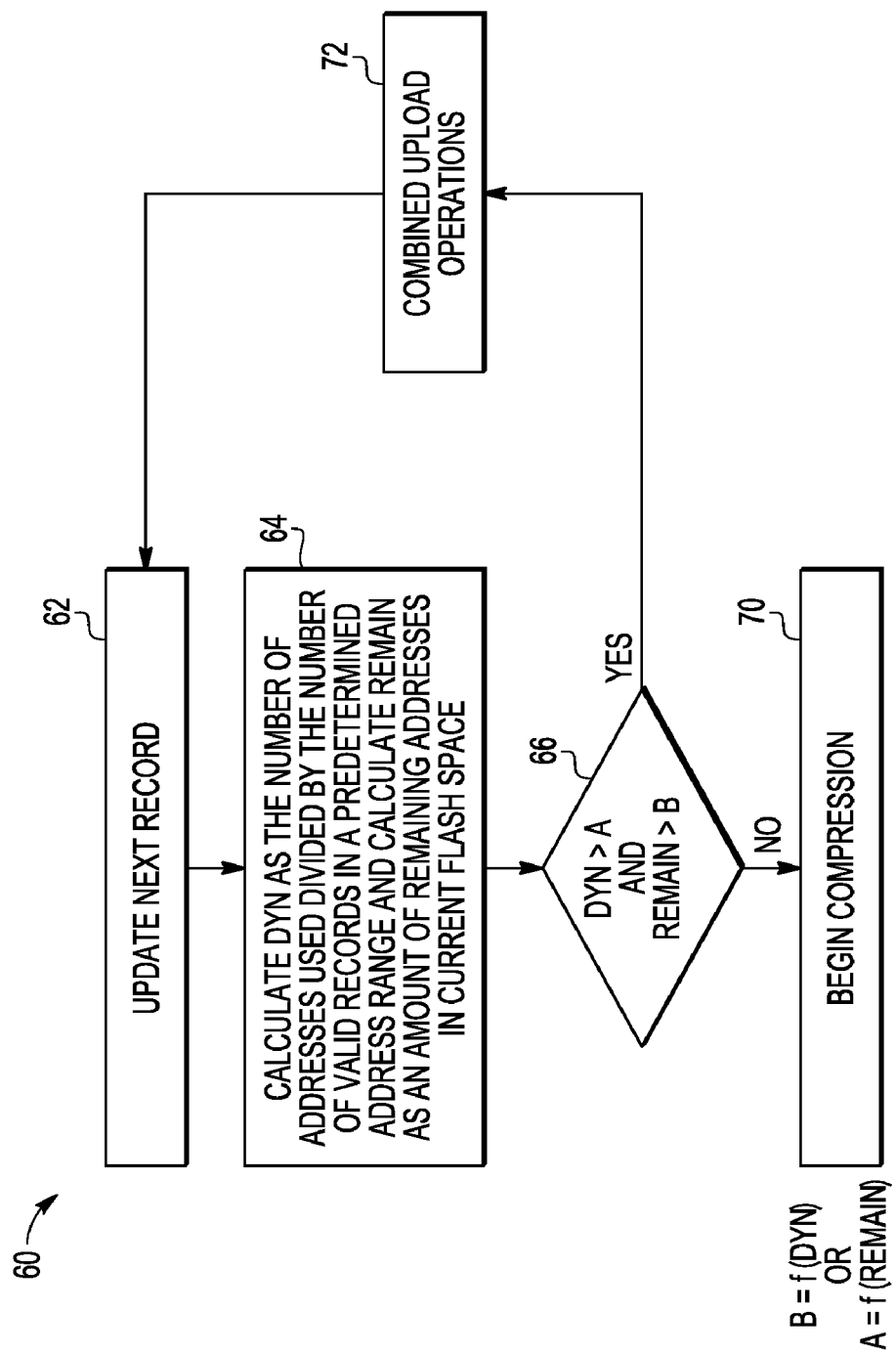
FIG. 3 is a flow chart showing a more general solution including the embodiment.

Shown in FIG. 3 is a flow chart 60 showing the process applied to system 10 and Eflash 24 of FIGS. 1 and 2. At a step 62 an update of the next record is performed. After this is performed, at step 64 the dynamic activity (DYN) is calculated by dividing the number of addresses used by the number of valid records in a predetermined address range. One example of this is dividing the number of possible records by the number of valid records in the oldest sector. This decision can be made for every time there is record being written or some other time such as when the full/active sector is filled. Also at step 64 is calculating the amount of remaining addresses (REMAIN) in the current Eflash space which is the amount of space available to be written without obtaining more space such as by erasing. This can be the amount of space available for writing records in the full/active sector plus the ready sectors. In step 66, a decision is made as to whether to begin compression, step 70, or continue updating, step 62, after combined upload operations, step 72. Updating is continued if DYN exceeds a threshold A and REMAIN exceeds a threshold B. Regardless of how big DYN is, there will be a point at which the amount of available space is so low that the compression must begin. As shown in FIG. 3, threshold B can be set at a level that is a function of the business activity. Alternatively, threshold A can be set at a level that is a function of the available space. The available space can be sufficiently high, that even the smallest possible dynamic activity would not require compression to begin. A way to achieve this dual criteria of DYN and REMAIN is with a look-up table. For a given available space, the threshold of A would be found in the look-up table. Similarly, for a given dynamic activity, the threshold of B would be found in a look-up table.

Another way of viewing the dynamic activity is the number of different addresses updated over the particular address range that is under consideration for being subjected to compression as compared to the total number of addresses in that address range.

Thus, it is seen that by taking into account dynamic activity in an emulation memory having an NVM, the endurance of the NVM can be improved. There are situations in which the dynamic activity allows for delaying compression where it may have otherwise have been done permanently resulting in improved endurance arising from the delay in performing the compression.

By now it should be appreciated that there has been provided a method that allows for doing a portion of the data transfer or a portion of the write process for each update cycle as needed to ensure that there is sufficient space available to perform updates without having to do a large data transfer and complete erase process all at once causing a large delay when that occurs.

Described is a method using a system having an emulation memory having a plurality of sectors for storing information and having a control circuit. The method includes calculating a number of addresses used divided by a number of valid records in a predetermined address range of the emulation memory to form a fraction. The method further includes calculating a number of addresses used divided by a number of valid records in a predetermined address range of the emulation memory to form a fraction. The method further includes calculating an amount of remaining addresses in a currently used space of the emulation memory which have not been used to store information. The method further includes determining whether the fraction that was calculated is greater than a first predetermined number and determining whether the amount of remaining addresses is greater than a second predetermined number. The method further includes if both the fraction is greater than the first predetermined number and the amount of remaining addresses is greater than the second predetermined number, responding to any subsequent update requests using the currently used space of the emulation memory, and otherwise determine that a compression of the emulation memory is required and copy valid data to an available sector of the emulation memory. The method may further comprise implementing the plurality of sectors of the emulation memory as two sectors, a first of the two sectors being the currently used space of the emulation memory having a first portion of utilized addressed space and a second portion of remaining addresses, and a second of the two sectors being an empty storage space. The method may further comprise implementing the plurality of sectors of the emulation memory with multiple sectors, a first portion of the emulation memory having a plurality of sectors that are not holding data, one or more of the plurality of sectors of the emulation memory being assigned as the currently used space of the emulation memory with a portion of the currently used space being the amount of remaining addresses which have not been used to store information. The method may further comprise determining the first predetermined number as a number which is a function of the amount of remaining valid addresses in the currently used space of the emulation memory which are not currently storing information. The method may further comprise determining the second predetermined number as a number which is a function of the fraction that was calculated. The method may further comprise calculating the number of addresses used divided by the number of valid records and calculating the amount of remaining addresses in response to a request to update a record in the emulation memory. The method may have a further characterization by which the compression further comprises erasing of an oldest full sector of the plurality of sectors and copying of valid information to the oldest full sector subsequent to the erasing.

Also described is a system including an emulation memory and a memory controller. The emulation memory has a plurality of sectors for sequentially storing information. The memory controller is coupled to the emulation memory and is for calculating a number of addresses used divided by a number of valid records in a predetermined address range of the emulation memory to form a fraction, calculating an amount of remaining addresses in a currently used space of the emulation memory which have not been used to store information, and determining whether a fractional percentage that was calculated is greater than a first predetermined number and determining whether the amount of remaining addresses is greater than a second predetermined number, wherein if both the fractional percentage is greater than the first predetermined number and the amount of remaining addresses is greater than the second predetermined number, the memory controller responds to any subsequent update requests using the currently used space of the emulation memory, and otherwise determines that a compression of the emulation memory is required and copies valid data to an available sector of the emulation memory. The emulation memory may further comprise two sectors, a first of the two sectors being the currently used space of the emulation memory having a first portion of utilized addressed space and a second portion of remaining addresses, and a second of the two sectors being an empty storage space. The emulation memory may further comprise multiple sectors, a first portion of the emulation memory having a plurality of sectors that are not holding data, one or more of the plurality of sectors of the emulation memory being assigned as the currently used space of the emulation memory with a portion of the currently used space being the amount of remaining addresses which have not been used to store information. The system may have a further characterization by which the memory controller determines the first predetermined number as a number which is a function of the amount of remaining valid addresses in the currently used space of the emulation memory which are not currently storing information. The system may have a further characterization by which the memory controller determines the second predetermined number as a number which is a function of the fractional percentage. The system may have a further characterization by which. The system may have a further characterization by which the memory controller performs said compression by erasing an oldest full sector of the plurality of sectors and copying of valid information to the oldest full sector subsequent to the erasing. The system may have a further characterization by which the memory controller performs said calculating in response to a request to update a record in the emulation memory.

Described also is a method using a system having a random access memory, an emulation memory having a plurality of sectors for storing information, and a memory controller. The method includes calculating a number of records in a predetermined address range of the emulation memory that have been updated more than a first predetermined number of times. The method further includes calculating an amount of remaining addresses in a currently used space of the emulation memory which have not been used to store information. The method further includes determining whether the number of records is greater than a second predetermined number and determining whether the amount of remaining addresses is greater than a third predetermined number. The method further includes if both the number of records is greater than the second predetermined number and the amount of remaining addresses is greater than the third predetermined number, responding to any subsequent update requests using the currently used space of the emulation memory, and otherwise determine that a compression of the emulation memory is required and copying valid data to an available sector of the emulation memory. The method may further include implementing the plurality of sectors of the emulation memory as two sectors, a first of the two sectors being the currently used space of the emulation memory having a first portion of utilized addressed space and a second portion of remaining addresses, and a second of the two sectors being an empty storage space. The method may further include implementing the plurality of sectors of the emulation memory with multiple sectors, a first portion of the emulation memory having a plurality of sectors that are not holding data, one or more of the plurality of sectors of the emulation memory being assigned as the currently used space of the emulation memory with a portion of the currently used space being the amount of remaining addresses which have not been used to store information. The method may further include determining the second predetermined number as a number which is a function of the amount of remaining valid addresses in the currently used space of the emulation memory which are not currently storing information. The method may further include determining the third predetermined number as a number which is a function of the fraction of records in the emulation memory which have been updated more than the first predetermined number. The method may further include calculating the number of records and calculating the amount of remaining addresses in response to a request to update a record in the emulation memory.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Also for example, in one embodiment, the illustrated elements of system 10 are circuitry located on a single integrated circuit or within a same device. Alternatively, system 10 may include any number of separate integrated circuits or separate devices interconnected with each other. For example, EEE memory system 18 may be located on a same integrated circuit as processor 14 or on a separate integrated circuit. Memory system 18 may be an embedded memory system or a stand alone memory system. Other module(s) 16 may also be located on separate integrated circuits or devices.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, particular memory sizes, sector sizes, and record sizes were described as an example but other sizes may be used. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a system having an emulation memory having a plurality of sectors for storing information, and control means, a method comprising:
    calculating a number of addresses used divided by a number of valid records in a predetermined address range of the emulation memory to form a fraction;
    calculating an amount of remaining addresses in a currently used space of the emulation memory which have not been used to store information;
    determining whether the fraction that was calculated is greater than a first predetermined number and determining whether the amount of remaining addresses is greater than a second predetermined number; and
    if both the fraction is greater than the first predetermined number and the amount of remaining addresses is greater than the second predetermined number, responding to any subsequent update requests using the currently used space of the emulation memory, and otherwise determine that a compression of the emulation memory is required and copy valid data to an available sector of the emulation memory.

2. The method of claim 1 further comprising:
implementing the plurality of sectors of the emulation memory as two sectors, a first of the two sectors being the currently used space of the emulation memory having a first portion of utilized addressed space and a second portion of remaining addresses, and a second of the two sectors being an empty storage space.

3. The method of claim 1 further comprising:
implementing the plurality of sectors of the emulation memory with multiple sectors, a first portion of the emulation memory having a plurality of sectors that are not holding data, one or more of the plurality of sectors of the emulation memory being assigned as the currently used space of the emulation memory with a portion of the currently used space being the amount of remaining addresses which have not been used to store information.

4. The method of claim 1 further comprising:
determining the first predetermined number as a number which is a function of the amount of remaining valid addresses in the currently used space of the emulation memory which are not currently storing information.

5. The method of claim 1 further comprising:
determining the second predetermined number as a number which is a function of the fraction that was calculated.

6. The method of claim 1 further comprising:
calculating the number of addresses used divided by the number of valid records and calculating the amount of remaining addresses in response to a request to update a record in the emulation memory.

7. The method of claim 1 further wherein the compression further comprises erasing of an oldest full sector of the plurality of sectors and copying of valid information to the oldest full sector subsequent to the erasing.

8. A system comprising:
an emulation memory having a plurality of sectors for sequentially storing information; and
a memory controller coupled to the emulation memory, the memory controller calculating a number of addresses used divided by a number of valid records in a predetermined address range of the emulation memory to form a fraction, calculating an amount of remaining addresses in a currently used space of the emulation memory which have not been used to store information, and determining whether a fractional percentage that was calculated is greater than a first predetermined number and determining whether the amount of remaining addresses is greater than a second predetermined number, wherein if both the fractional percentage is greater than the first predetermined number and the amount of remaining addresses is greater than the second predetermined number, the memory controller responds to any subsequent update requests using the currently used space of the emulation memory, and otherwise determines that a compression of the emulation memory is required and copies valid data to an available sector of the emulation memory.

9. The system of claim 8 wherein said emulation memory further comprises two sectors, a first of the two sectors being the currently used space of the emulation memory having a first portion of utilized addressed space and a second portion of remaining addresses, and a second of the two sectors being an empty storage space.

10. The system of claim 8 wherein said emulation memory further comprises multiple sectors, a first portion of the emulation memory having a plurality of sectors that are not holding data, one or more of the plurality of sectors of the emulation memory being assigned as the currently used space of the emulation memory with a portion of the currently used space being the amount of remaining addresses which have not been used to store information.

11. The system of claim 8 wherein the memory controller determines the first predetermined number as a number which is a function of the amount of remaining valid addresses in the currently used space of the emulation memory which are not currently storing information.

12. The system of claim 8 wherein the memory controller determines the second predetermined number as a number which is a function of the fractional percentage.

13. The system of claim 8 wherein the memory controller performs said calculating in response to a request to update a record in the emulation memory.

14. The system of claim 8 wherein the memory controller performs said compression by erasing an oldest full sector of the plurality of sectors and copying of valid information to the oldest full sector subsequent to the erasing.

15. In a system having a random access memory, an emulation memory having a plurality of sectors for storing information, and a memory controller, a method comprising:
calculating a number of records in a predetermined address range of the emulation memory that have been updated more than a first predetermined number of times;
calculating an amount of remaining addresses in a currently used space of the emulation memory which have not been used to store information;
determining whether the number of records is greater than a second predetermined number and determining whether the amount of remaining addresses is greater than a third predetermined number; and
if both the number of records is greater than the second predetermined number and the amount of remaining addresses is greater than the third predetermined number, responding to any subsequent update requests using the currently used space of the emulation memory, and otherwise determine that a compression of the emulation memory is required and copying valid data to an available sector of the emulation memory.

16. The method of claim 15 further comprising:
implementing the plurality of sectors of the emulation memory as two sectors, a first of the two sectors being the currently used space of the emulation memory having a first portion of utilized addressed space and a second portion of remaining addresses, and a second of the two sectors being an empty storage space.

17. The method of claim 15 further comprising:
implementing the plurality of sectors of the emulation memory with multiple sectors, a first portion of the emulation memory having a plurality of sectors that are not holding data, one or more of the plurality of sectors of the emulation memory being assigned as the currently used space of the emulation memory with a portion of the currently used space being the amount of remaining addresses which have not been used to store information.

18. The method of claim 15 further comprising:
determining the second predetermined number as a number which is a function of the amount of remaining valid addresses in the currently used space of the emulation memory which are not currently storing information.

19. The method of claim 15 further comprising:

determining the third predetermined number as a number which is a function of the fraction of records in the emulation memory which have been updated more than the first predetermined number.

20. The method of claim 15 further comprising:

calculating the number of records and calculating the amount of remaining addresses in response to a request to update a record in the emulation memory.

* * * * *